US011432426B2

(12) United States Patent
Triplett et al.

(10) Patent No.: US 11,432,426 B2
(45) Date of Patent: Aug. 30, 2022

(54) COMPUTER ISOLATION HOUSING

(71) Applicant: Aertight Systems, Inc., Millersville, MD (US)

(72) Inventors: Gordon Triplett, Severna Park, MD (US); Julia Triplett, Severna Park, MD (US); Matthew Findley, Severna Park, MD (US); Edward Triplett, Hillsborough, NC (US)

(73) Assignee: Aertight Systems, Inc., Millersville, MD (US)

( * ) Notice: Subject to any disclaimer, the term of this patent is extended or adjusted under 35 U.S.C. 154(b) by 275 days.

(21) Appl. No.: 16/848,313

(22) Filed: Apr. 14, 2020

(65) Prior Publication Data

US 2020/0329579 A1 Oct. 15, 2020

Related U.S. Application Data

(60) Provisional application No. 62/833,777, filed on Apr. 14, 2019.

(51) Int. Cl.
*H05K 7/14* (2006.01)
*G06F 1/18* (2006.01)
(Continued)

(52) U.S. Cl.
CPC .......... *H05K 7/1488* (2013.01); *G06F 1/184* (2013.01); *H05K 5/0213* (2013.01);
(Continued)

(58) Field of Classification Search
CPC .......... H02B 1/052; H02B 1/044; H02B 1/06; H02B 1/28; H02B 1/40; H02B 1/42;
(Continued)

(56) References Cited

U.S. PATENT DOCUMENTS 4,692,838 A * 9/1987 Merchant ................. H02B 1/40
49/260
5,281,018 A 1/1994 Cullinan
(Continued)

FOREIGN PATENT DOCUMENTS

CN 202372897 U 8/2012
WO WO-2017075039 A1 * 5/2017 ............. F16B 21/09

*Primary Examiner* — Michael A Matey
(74) *Attorney, Agent, or Firm* — David E. Boundy; Potomac Law Group PLLC

(57) ABSTRACT

A modular mounting for a computer motherboard. An outer cabinet is designed to provide a protective enclosure for electrical components, and designed to permit throughhole drilling to facilitate mounting on a wall while avoiding disturbance of contents to be mounted within the outer cabinet. A subpanel plate is designed to detachably and securely attach a computer motherboard and cage assembly, and designed to removably mount the motherboard and cage assembly within the outer cabinet as a modular component, mounting of the motherboard and cage assembly being independent of power supply and nonvolatile storage. An inner cage is designed to protectably mount and enclose a computer motherboard and heat sink, and mount to the subpanel plate. A multipole switch may have a set of contacts for each conductor of a network cable entering the outer cabinet, one throw of the switch connecting all conductors of the cable, another throw of the switch disconnecting all contacts of the cable.

19 Claims, 8 Drawing Sheets

(51) Int. Cl.
*H05K 7/20* (2006.01)
*H05K 5/02* (2006.01)

(52) U.S. Cl.
CPC ......... *H05K 5/0221* (2013.01); *H05K 7/1427* (2013.01); *H05K 7/2039* (2013.01); *H05K 7/20145* (2013.01); *H05K 7/20754* (2013.01)

(58) Field of Classification Search
CPC .. G02B 6/4452; G02B 6/4444; G02B 6/4442; G06F 1/181; G06F 1/183; G06F 1/184; G06F 1/187; G06F 1/188; G06F 1/189; H02G 3/086; H02G 3/14; H02G 3/10; H05K 7/1427; H05K 7/1439; H05K 7/1452; H05K 7/1457; H05K 5/0008; H05K 7/1488; H05K 5/0213; H05K 5/0221; H05K 7/20145; H05K 7/2039; H05K 7/20754; H04M 1/04
See application file for complete search history.

(56) References Cited

U.S. PATENT DOCUMENTS

| | | | |
|---|---|---|---|
| 5,282,114 A | 1/1994 | Stone | |
| 5,430,607 A | 7/1995 | Smith | |
| 5,570,270 A * | 10/1996 | Naedel | G06F 1/183 |
| | | | 361/748 |
| 5,577,205 A | 11/1996 | Hwang | |
| 5,708,751 A * | 1/1998 | Mattei | G02B 6/4453 |
| | | | 385/134 |
| D408,015 S * | 4/1999 | Faucher | D13/152 |
| 5,907,473 A * | 5/1999 | Przilas | H05K 7/20345 |
| | | | 174/15.1 |
| 5,918,018 A | 6/1999 | Gooderum | |
| 6,330,152 B1 | 12/2001 | Vos | |
| 6,362,423 B1 * | 3/2002 | Wise | H02B 1/06 |
| | | | 361/752 |
| D466,087 S * | 11/2002 | Cuny | D13/152 |
| 6,718,415 B1 | 4/2004 | Chu | |
| 6,765,793 B2 | 7/2004 | Kehret | |
| 6,915,934 B2 | 7/2005 | Hassett | |
| 7,094,110 B1 | 8/2006 | Shelton | |
| 7,109,414 B2 * | 9/2006 | Reynolds | H02G 3/086 |
| | | | 174/53 |
| 9,351,414 B1 * | 5/2016 | Tatem | H04N 7/106 |
| 9,377,808 B1 * | 6/2016 | Sivertsen | G06F 1/181 |
| 10,390,447 B1 * | 8/2019 | McGee | H01R 9/2491 |
| 2007/0159791 A1 * | 7/2007 | Pongracz | H05K 7/20145 |
| | | | 361/688 |
| 2007/0197301 A1 * | 8/2007 | Cole | G07F 17/32 |
| | | | 463/47 |
| 2008/0182642 A1 * | 7/2008 | Cole | G07F 17/32 |
| | | | 463/20 |
| 2016/0006223 A1 * | 1/2016 | Sinistro | H02J 13/00034 |
| | | | 361/622 |
| 2020/0067284 A1 * | 2/2020 | Dudek | H02B 1/42 |

* cited by examiner

COMPUTER ISOLATION HOUSING

This application claims priority, as a non-provisional of provisional of U.S. Provisional Application Ser. No. 62/833,777, filed Apr. 14, 2019. The entire disclosure of the parent application is incorporated herein by reference.

BACKGROUND

This application relates to protective enclosures for computer boards.

SUMMARY

In general, in a first aspect, the invention features a modular mounting for a computer motherboard. An outer cabinet is designed to provide a protective enclosure for electrical components, and designed to permit throughhole drilling to facilitate mounting on a wall while avoiding disturbance of contents to be mounted within the outer cabinet. A subpanel plate is designed to detachably and securely attach a computer motherboard and cage assembly, and designed to removably mount the motherboard and cage assembly within the outer cabinet as a modular component, mounting of the motherboard and cage assembly being independent of power supply and nonvolatile storage. An inner cage assembly is designed to protectably mount and enclose a computer motherboard and heat sink, and mount as a motherboard and cage assembly to the subpanel plate.

Embodiments of the invention may include one or more of the following features. These features may be used singly, or in combination with each other. A multipole switch may have a set of contacts for each conductor of a network cable entering the outer cabinet, one throw of the switch connecting all conductors to permit a CPU of the motherboard to communicate over the cable to other devices of the network, another throw of the switch disconnecting all contacts of the cable. A key tumbler lock may be designed to move the multipole switch between the connected throw and the disconnected throw. An air vent may have baffles designed to pass air and impede fluid intrusion. The baffles may be arranged in a zigzag pattern of overlapping baffles. A touch switch may have an illumination pattern indicating presence, absence, and status of virtual machines present on a physical machine corresponding to the switch. A touch switch may be connected to a physical machine and that, when activated, instructs the physical machine to transfer any virtual machines hosted or active thereon to be transferred to another physical machine.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION

Figure 1A:
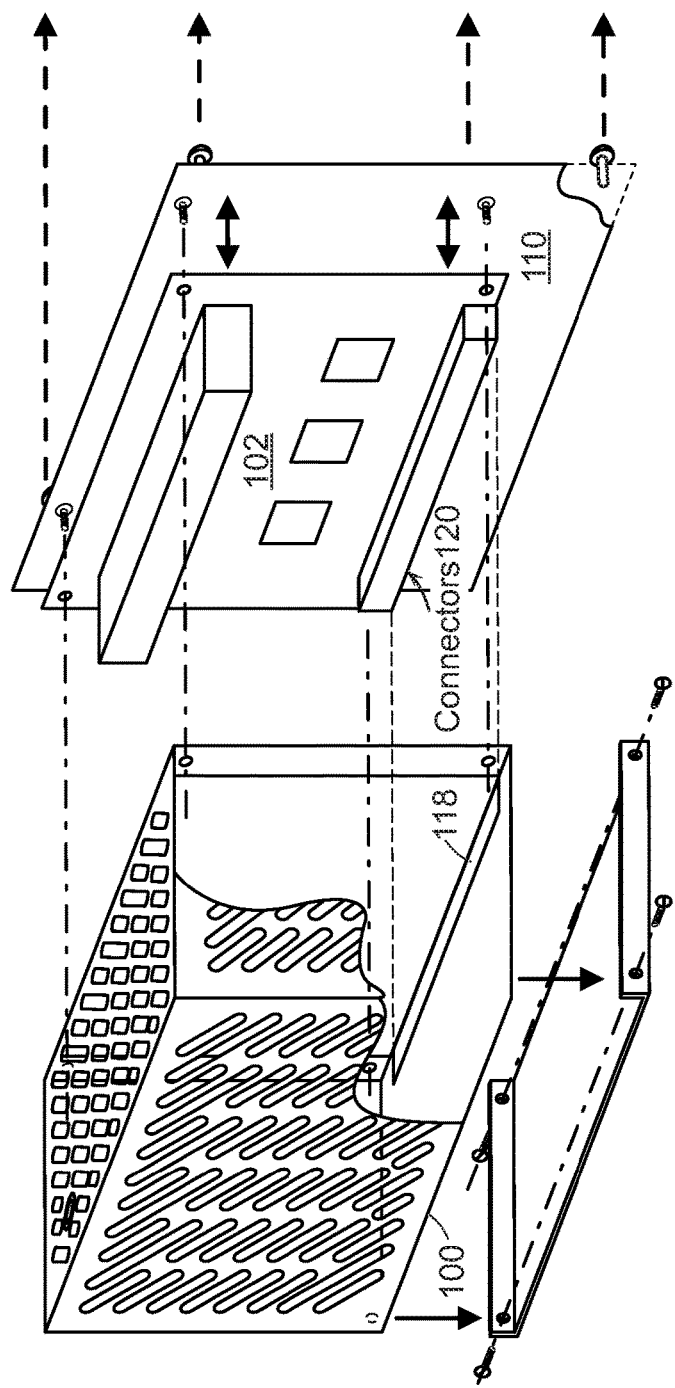
FIGS. 1A and 1B are an exploded diagram of an enclosure system for a computer board.
Figure 1B:
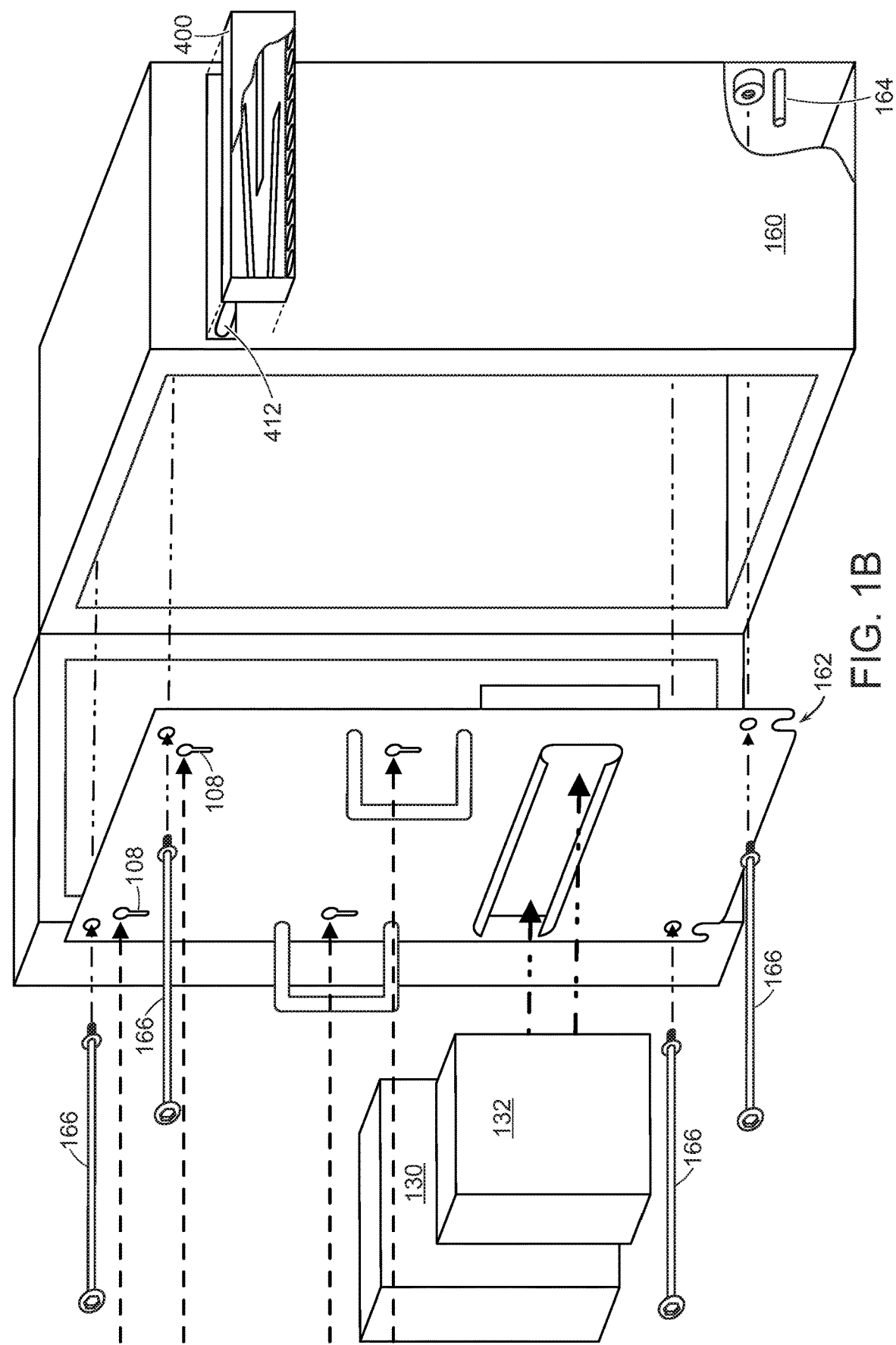
Figure 1C:
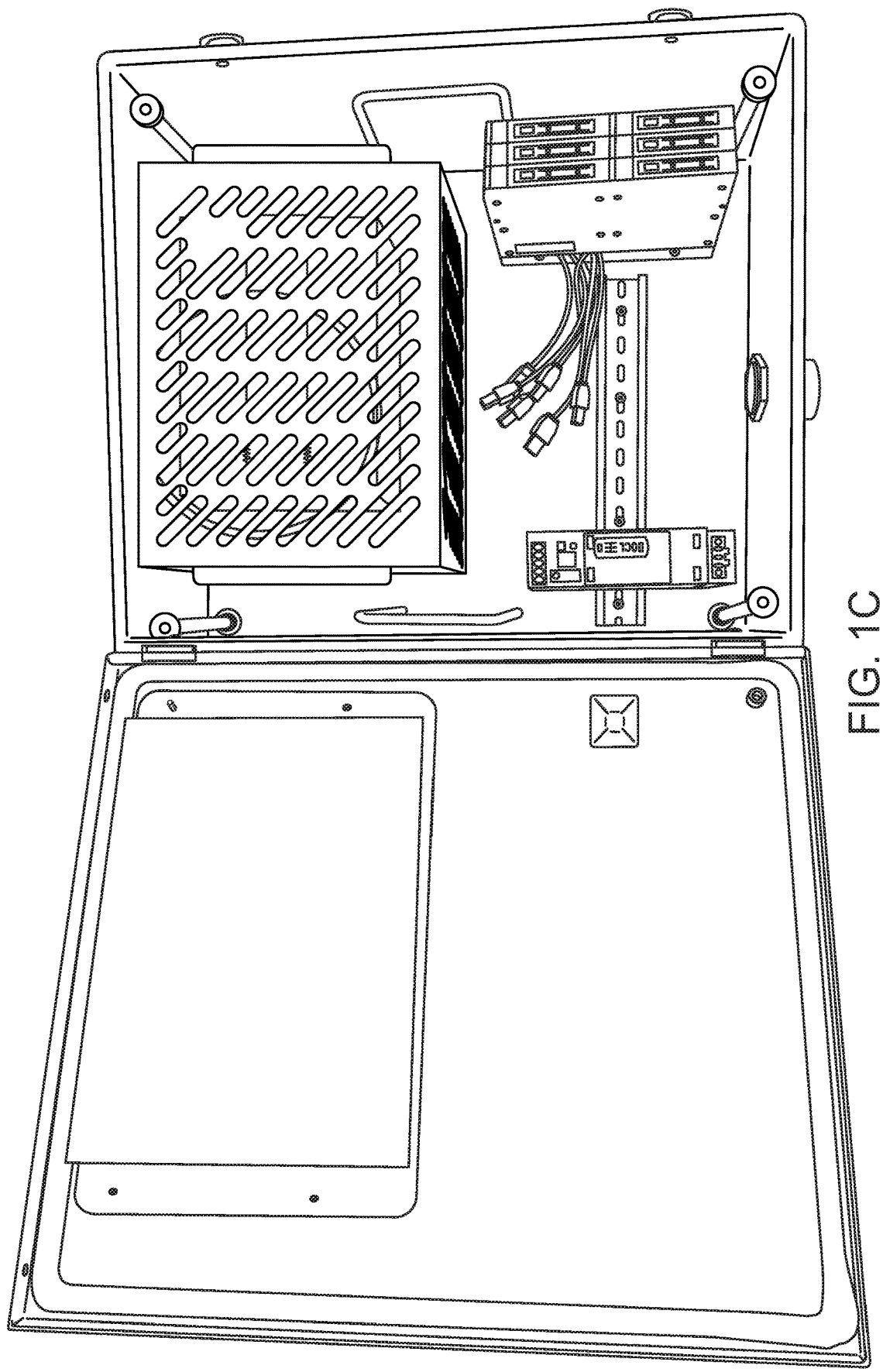
FIG. 1C is a perspective view of an enclosure system for a computer board.

The Description is organized as follows.
I. Inner cage
II. Modular Server Cabinet
III. Computer Islanding Switch
IV. Virtual Machine Transfer System
V. Baffle Vent for Liquid Intrusion Prevention I. Modular Mounting for Replaceable Motherboard Referring to FIGS. 1A, 1B, and 1C, a modular, rugged inner cage 100 may be designed around the needs of a ruggedized, on-site, modularly-replaceable system in industrial or secure facilities, to permit ready replacement of a computer motherboard (for replacement in the case of failure, or for upgrade) while leaving other system components in place. A set of components that are physically connected, and not readily separated or subdivided for field replacement, may be enclosed within a single cage. That group of components may be a computer motherboard 102 with a CPU chip and the rest of a processor chip set, heat sinks, and connectors.

Those components may be mounted within an inner cage 100. Inner cage 100 may be roughly a rectangular prism, dimensioned and otherwise configured for fan-less applications and industry standard size (mini-itx) motherboards 102. Inner cage 100 structure, for example, the four sides and top of inner cage 100, may be made of diamond mesh lath, slotted steel sheet, or similar tough shielding. The bottom may be a metal pan (such as solid sheet steel) attached to the upper structure with tamper-proof fasteners. Four shoulder screws 106 may be installed to allow for latching the inner cage 100 into four key-slot catches 108 on a subpanel mounting plate 110, which may in turn be enclosed in a larger outer cabinet 160. In some cases, on one side of inner cage 100, cut outs 118 may provide access to motherboard ports and connectors 120. In other cases, on one side of inner cage 100, a set of ports/connectors may be provided, and cabled to motherboard 102 inside the inner cage. Inner cage 100 may be formed of a high-conductivity metal such as steel, so that it forms a Faraday cage to protect the computer within from electromagnetic waves.

The replaceable unit within inner cage 100 may be designed to be separable from power supply components 130 and non-volatile storage 132 (such as rotating or solid-state disk). Power supply 130 and non-volatile storage 132 may be mounted on a DIN rail on a base plate outside inner cage 100. Inner cage 100 may be used within a system that has a separate modular power supply 130 and/or nonvolatile storage 132 external to inner cage 100. This separation offers the user the advantage of allowing removal of motherboard 102 as a modular component without also removing power supply 130 and/or nonvolatile storage 132. Modular separation allows a user to provision their full computer systems that incorporate this inner cage 100 with a combination of power sources (ac and dc power), redundant power supplies, UPS technologies to power motherboard 102, and whatever nonvolatile storage technologies and capacities. In cases where power supply 130 and/or nonvolatile storage 132 are mounted outside inner cage 100, a user has greater freedom to mix-and-match precise choices of motherboard, power supply 130, and storage.

Inner cage 100 may be used with fanless computer motherboards 102 that rely on passive heat sinks or air convection technologies that are completely enclosed within inner cage 100 and are considered "non-maintenance" items. Inner cage 100 may be securely attached to the bottom pan with tamper-proof screws that are not intended to be user-serviceable. In cases were the fan, power supply 130, and non-volatile memory 132 are all outside inner cage 100, and all internal ports have conductors to the connectors on the outside of inner cage 100, need to physically touch or alter motherboard 102 may be reduced. Together, these features reduce the need for a latched maintenance entry into inner cage 100. This system provides better mechanical isolation, for example in industrial environments that have moving objects that might damage the computer, but there's not a lot of contamination dust. Furthermore, this provides yet another level of security for users who want to ensure items attached to motherboard 102 itself (TPM Encryption Modules, RAM Modules, etc.) are not exposed. Diamond mesh lath or slotted sheet metal provide high physical security, while allowing natural passive or convective air flow into inner cage 100.

Inner cage 100 may be used with COTS (Commercial off the shelf modules) that are "Mini-ITX size." This design provides flexibility in component choice, and may allow for the re-use of inner cage 100 for upgraded (future mini-itx size motherboards). In some cases, inner cage 100 may be tightly packed within the larger outer cabinet (FIG. 1D) so the ability for the replacement of motherboard 102 itself in the same size inner cage 100, years later, can offer the user many advantages. This is a supporting feature in a system that allows fast motherboard replacement without a full reinstall of the system, thereby avoiding downtime in industrial environments. Virtual Computer Systems that are abstracted from their hardware can specifically take advantage of modular hardware components.

The design shown achieves a desirable combination of air-permeability, security, and modularity, to improve mean time to repair critical computer systems. Other designs are possible, with varying materials, sizes, and implementations. For example, inner cage 100 may be a two-sided mesh tent to prevent "fat finger mashing" of motherboard components.

Mounting of motherboard 102 to inner cage 100, attachment of inner cage 100, with motherboard 102 affixed therein, to subpanel mounting plate 110, and mounting of subpanel mounting plate 110 into outer cabinet 160 may be by screws; quick-release connectors; velcro fasteners; shoulder elements, hooks, or pegs to latch into holes, slots, or cutouts; fasteners; adhesives; or any other form of mounting fastener or connector. In some cases, electrically conductive connections may be preferable, and in other cases insulating connections may be preferable. In some cases, for example screws 166 discussed below, the appropriate fastener may be chosen for accessibility, strength, detachability, and other properties.

The modular inner cage 100 and subpanel mounting plate may be used with an outer cabinet as described next, or may be used alone.

II. Modular Server Outer Cabinet

A modular server outer cabinet 160 may be useful for computer systems that have no moving parts and that are passively cooled. Outer cabinet 160 may include a steel (or hard plastic) box that is wall mounted and includes a removable internal "subpanel." Outer cabinet 160 may be designed as physical barrier to entry and may be locked to prevent access to the components contained within. The system may provide the capability to be a completely standalone system, in that, a touchscreen display may be built into the front of the system and only approved data access ports and power ports may be left exposed externally.

Modular server outer cabinet 160 may offer several advantages. First, the entire outer cabinet may allow for installation without any associated subcomponents. This may allow trade craftsmen to safely drill cable access ports in the external outer cabinet where they need to land power and data, while internal components 100, 102, 130, 132 are not installed, to reduce possibility of damaging those internal components. Similarly, mounting holes may be drilled. In industrial and large commercial environments, where electrical busway and network data lines are typically protected within rigid conduit, outer cabinet 160 may allow additional flexibility to land conduit holes anywhere on the external casing of outer cabinet 160 assists in installation speed. This arrangement provides "box level" redundancy, rather than component-by-component redundancy. This in, turn, may allow spatial or geographic dispersal, which diversifies risk. Box-level redundancy may also improve serviceability.

Outer cabinet 160 may combine both tool-less subcomponent modularity and intrusion protection at the same time. If components may be installed into outer cabinet 160 without use of tools, risks may be reduced of damage from installation and maintenance (falling screws, mechanical shavings, etc.). Concurrently, outer cabinet 160 may provide significant protection against physical intrusion and unauthorized access.

Outer cabinet 160 may provide a hardened exterior that is wall mounted and requires a keyed or combination locked entry to access the subcomponents and only exposes the ports and access methods the customer wants. Pre-drilled holes and open access to I/O ports and the like, may be avoided to reduce penetration vulnerability. Reduction in vulnerability may be especially important in secure environments.

Outer cabinet 160 may provide a field serviceable system that permits replacing or upgrading the internal components of the server system, such as removable hard drives, removable power supplies, removable display components, and various combinations of these items, up to and including replacement of all system subcomponents in a computer system. Field service may be improved by tool-less design, color coded cable assembly configuration, and use of modular components.

Subpanel 110 (with motherboard 102 and inner cage 100 attached thereto as a modular unit) may be mounted into outer cabinet 160 by first hanging by slots 162 onto pegs 164 and then affixed more durably by screws 166, which are long enough to be turned from the opening of cabinet 160 while making the affixation at the back of cabinet 160. Mounting of outer cabinet 160 should consider tight clearances on mounting space, landing locations for cables, and physical environmental considerations. Outer cabinet 160 may allow the user an upgrade process that improves upgrade speeds, deceases mean time to repair, and provides them future-proof piece of mind in their technology project planning.

An outer cabinet may have off-the-shelf dimensions, or may be custom designed for a specific installation. A custom-installation should be designed to keep clearances tight but reasonable for modularity, to promote fanless air circulation, and the arrangement of all components inside outer cabinet 160 should be carefully planned to maximize passive air flow to the hottest components and keep direct heat sources away from the most critical of components (data drives offset to the lower right when wall mounted).

To allow heat dispersal, the largest heat generator within inner cage 100—which is usually the microprocessor chip—may be positioned as far as possible from both the data storage area and power supply unit 130, and thereby to have the largest adjacent heat radiation area directly beside it.

The entire design may be engineered onto a removable subpanel in inner cage 100. Components within outer cabinet 160 may have a one-inch gap between the topmost heat-generating component. This gap may provide a corridor for heat to travel horizontally without obstruction, for example, toward the passive heat vents installed at the top corners of outer cabinet 160.

III. Computer Islanding Switch

Figure 2:
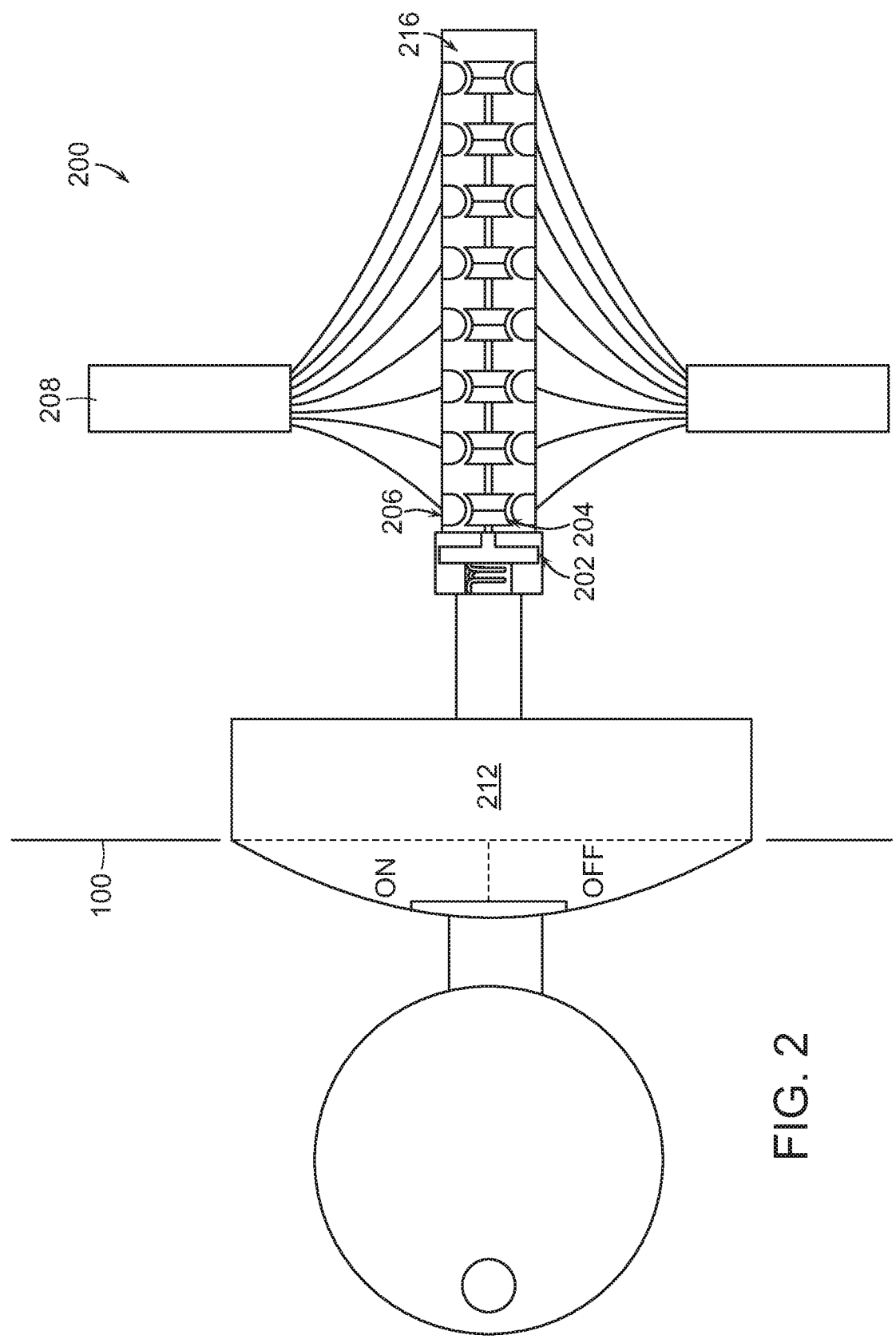
FIG. 2 is a schematic view of a switch.

Referring to FIG. 2, a mechanical keyed switch 200 may toggle complete physical coupling and decoupling of a standard cat5 Ethernet cable. Key switch 200 may be housed within a cylindrical protected inner cage 100 and may be interconnected to control an eight-pole single throw switch 202. When the switch is activated (key is turned) switch 202 bridges the connection by pushing the switch "T-Bar" between each of the interrupted contact pairs 204, 206 to make the connections. When de-activated (key is turned in reverse) the switch breaks connections between the mated contacts 204, 206 with a minimum of 0.5 mm gap between them to provide a complete air gap separation.

To create switch 200, an 8-pole single-throw rotary switch may be obtained, for example a switch used in older models of HAM radio tuners, from Schweitzer Engineering Labs in Pullman, Wash. Then, a conventional Cat5 Ethernet cable 208 may be cut and stripped, and each side of each of the eight conductors may be screwed to opposing terminals of the switch. The switch may be installed in a through-panel key tumbler housing 212, so that the throw of the switch is key-controlled. In the Schweitzer switch, one set of contracts 204 is concave, bridged between opposing sides only, and the other set of contacts 206 is convex, so that it connects only a single wire from a single cable feed at a time. A small spring 216 may maintain pressure on the Non-Conductive-Contact-Slide-Bar to push it back into ON position when key is turned.

A full eight-conductor isolation provides complete air-gap isolation that is not available when only the signal or transmission pair of the conductors is interrupted. Keyed access prevents the mistakes of exposed toggle switches, and is not vulnerable to being hacked from outside by an adversary. An eight-conductor break by means of a mechanical switch may improve convenience, during maintenance or service, to completely isolate one processor with a single motion. An eight-conductor mechanical switch may reduce the opportunity for malicious adversaries to rewire either upstream or downstream to bypass the isolation switch. Complete, on-demand, eight-conductor isolation may be important in hazardous or secure environments, since these are typically isolated environments that may require separation or isolation from an always-on network connection. This system provides local operators an improved balance of control, ease of use, and assurance of security possible in providing on-demand access to critical computing infrastructure components.

IV. Virtual Machine Transfer System

Figure 3A:
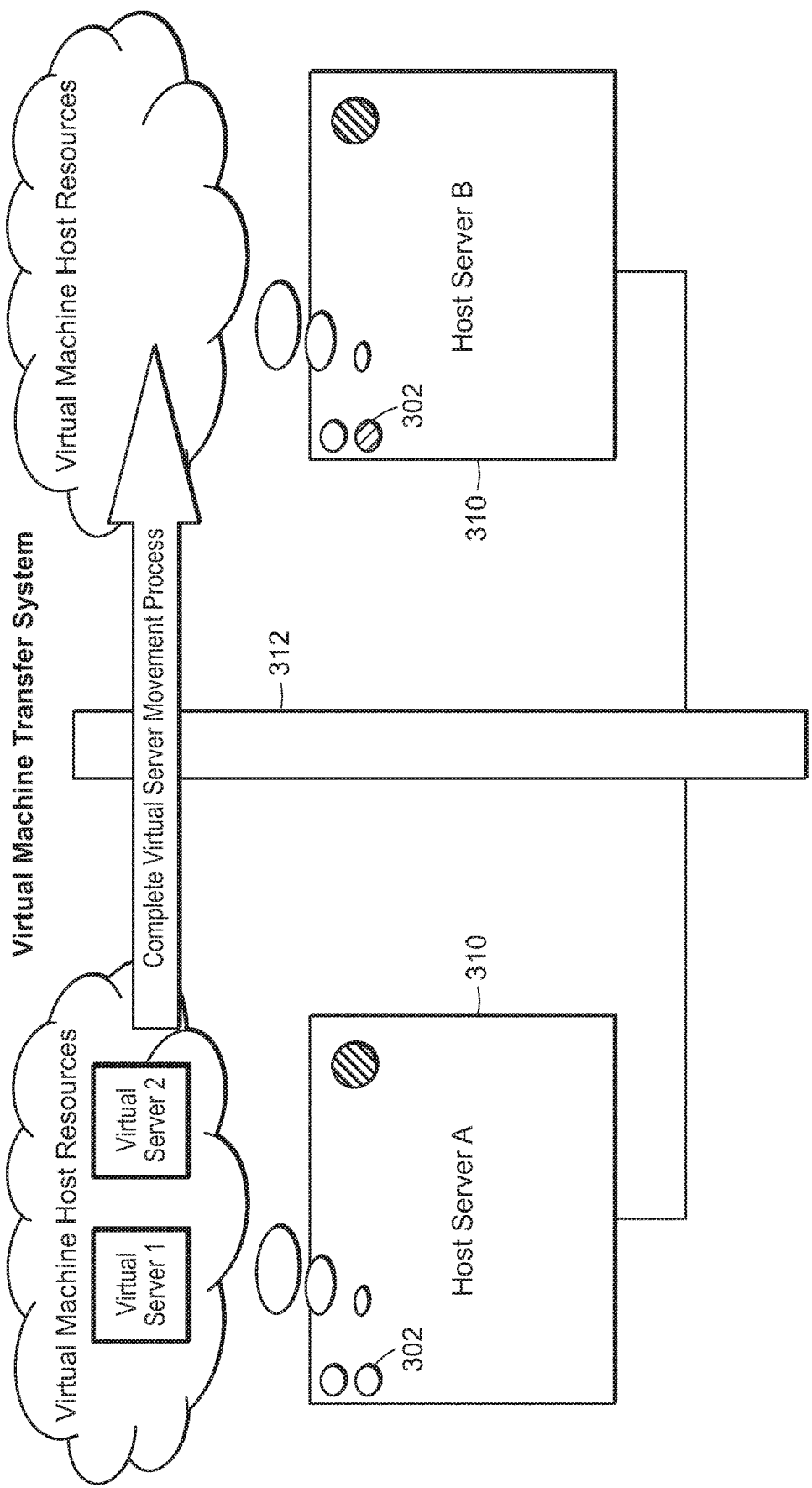
FIG. 3A is a schematic view of a computer system and a process for moving a virtual machine process from one physical computer to another.
Figure 3B:
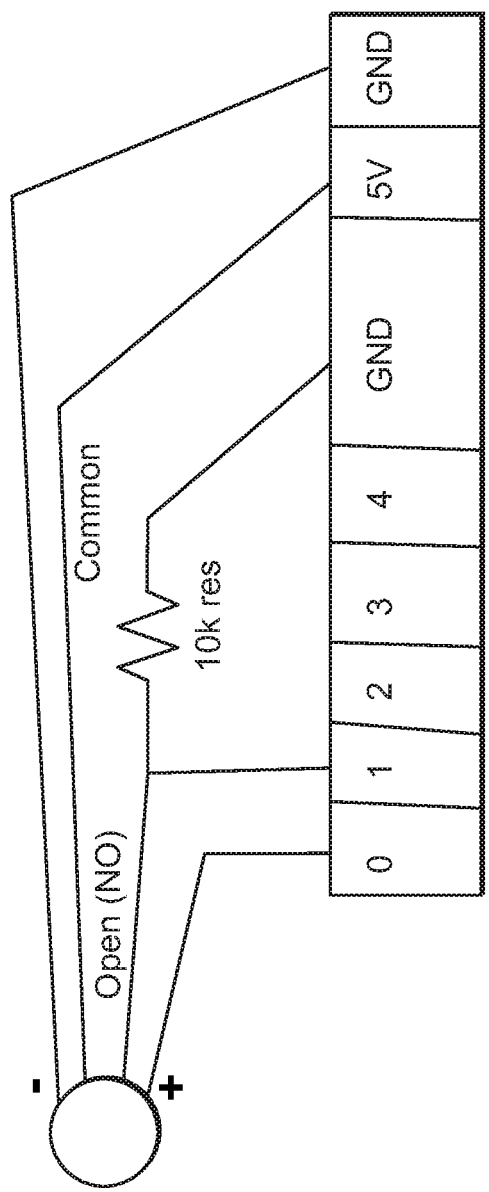
FIG. 3B is a circuit schematic.
Figure 3C:
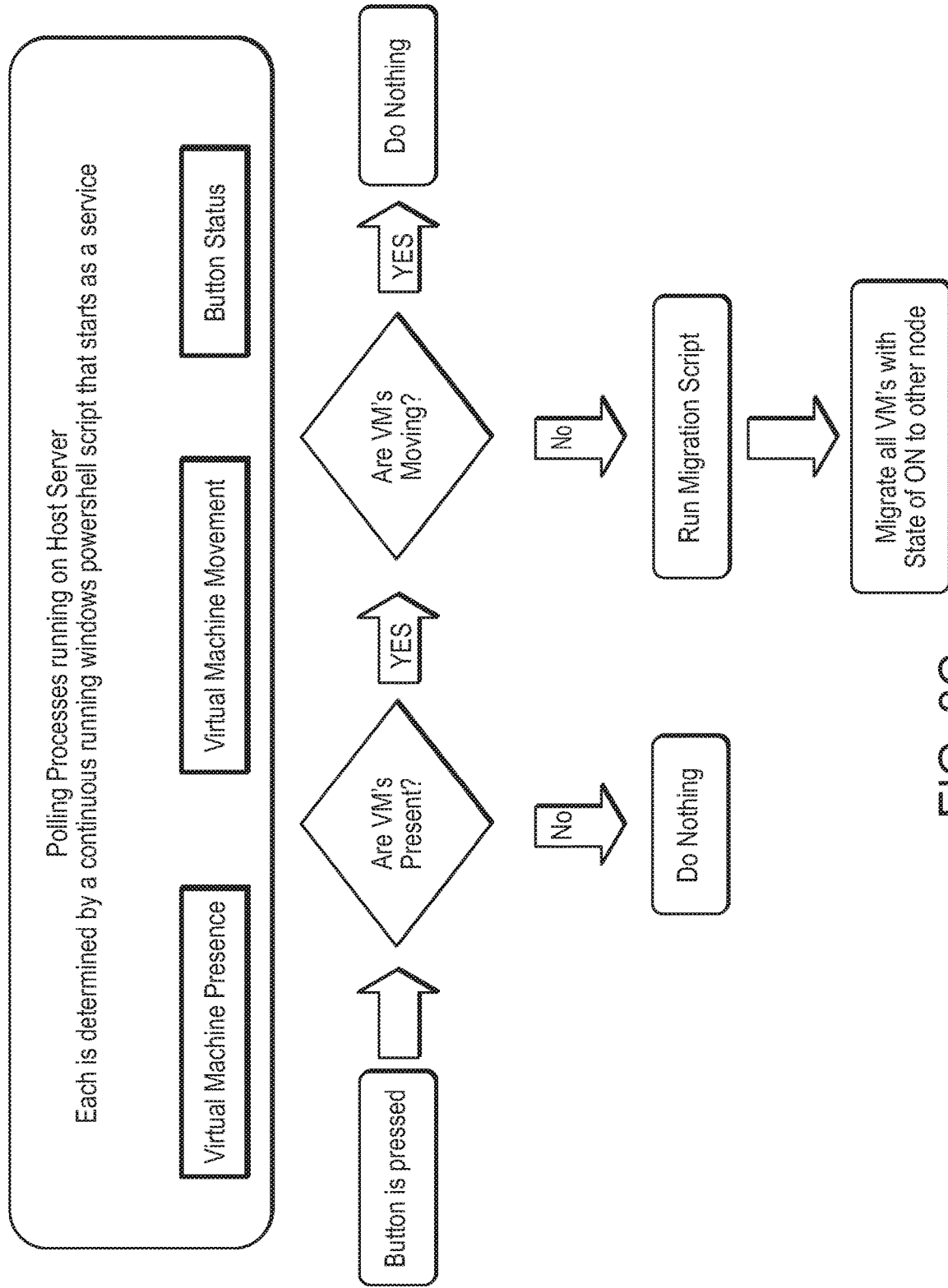
FIG. 3C is a flowchart.

Referring to FIGS. 3A, 3B, and 3C, a virtual machine control switch 300 may provide an indicator and press-button switch that allows management of virtual machines on physical machines, and allows an untrained user to direct a virtual machine hypervisor to move all virtual machines off a specified physical machine, so that the physical machine can be switched out of a machine cluster or taken down for service. Mechanical and software components cooperate to provide this capability, and simplify virtual machine switching so untrained service personnel can effect virtual machine migration. A physical mechanical system provides an LED status indicator and a press-button switch by which a service tech can request that all virtual machines be moved. Software scripts invoke controls provided by a virtual machine hypervisor (such as VMware, Microsoft Hyper-V, Citrix Hypervisor, Oracle VirtualBox, or the like). Typically, the different physical machines 310 may be in different physical locations, and there may be a physical barrier 312 between.

An LED momentary pushbutton 302 may be combined with a custom software program that monitors both the status of virtual machines on a computer host and provides simple scripts for transferring virtual machines between two hosts with the press of the button. LED 302 may indicate (as illuminated) that at least one Virtual Machines (Virtual Servers) is active and running on this host. When LED 302 is blinking, that may indicate that the host is actively "transferring" virtual machines to other host. When LED 302 is off, that may indicate that no Virtual Machines are actively running on this Host machine. The system allows the user to completely transfer all the virtual machines between two host computers with the press of a button, and to determine the status (success or failure) of this transfer with a visual indication light. The system is designed to be included in a two-host virtual server cluster. Between the two hosts, the software continually polls the underlying host to determine if a) virtual machines are present and running and b) if their status is in a "moving state". If virtual machines are present and running on the host, an indicator light is illuminated on the button. If virtual machines are moving, the indicator light is flashing. If virtual machines are not present or moving, the light is not illuminated.

Two momentary LED pushbuttons 302 may be installed inside the host server housings for each of the relevant physical machines. These may be installed through outer cabinet 160 panel or within a sub housing inside of the host server housing. Then, following the wiring diagram in FIG. 3B, each pushbutton is wired to a GPIO (general purpose input output) microcontroller which itself is then connected to the host server via USB. Windows drivers are installed and the microcontroller switch is then assigned a COM port within Windows with which software can communicate with the microcontroller. Application software may be provided that recognizes the COM port of the microcontroller, and based on that recognition, continually polls the controller to detect if a button has been pressed. Additionally, the application may poll the status of the host server to determine whether virtual machines are present, and if so, whether their state is asleep or "moving." The device may be programmed to indicate status on the LED: for example, an LED indicator may be solid "on" if a virtual machine is present, and may be set to flash if the virtual machine is moving. Other flash patterns, or multicolor LEDS may be used to indicate status, or to alert a human to take extra steps not to disturb active running host systems before taking a physical machine down.

Referring to FIG. 3C, the software may be provided as scripts that poll relevant conditions, and interact with the virtual machine hypervisor to effect movement of virtual machines among physical machines.

V. Baffle Vent for Liquid Intrusion Prevention

Figure 4:
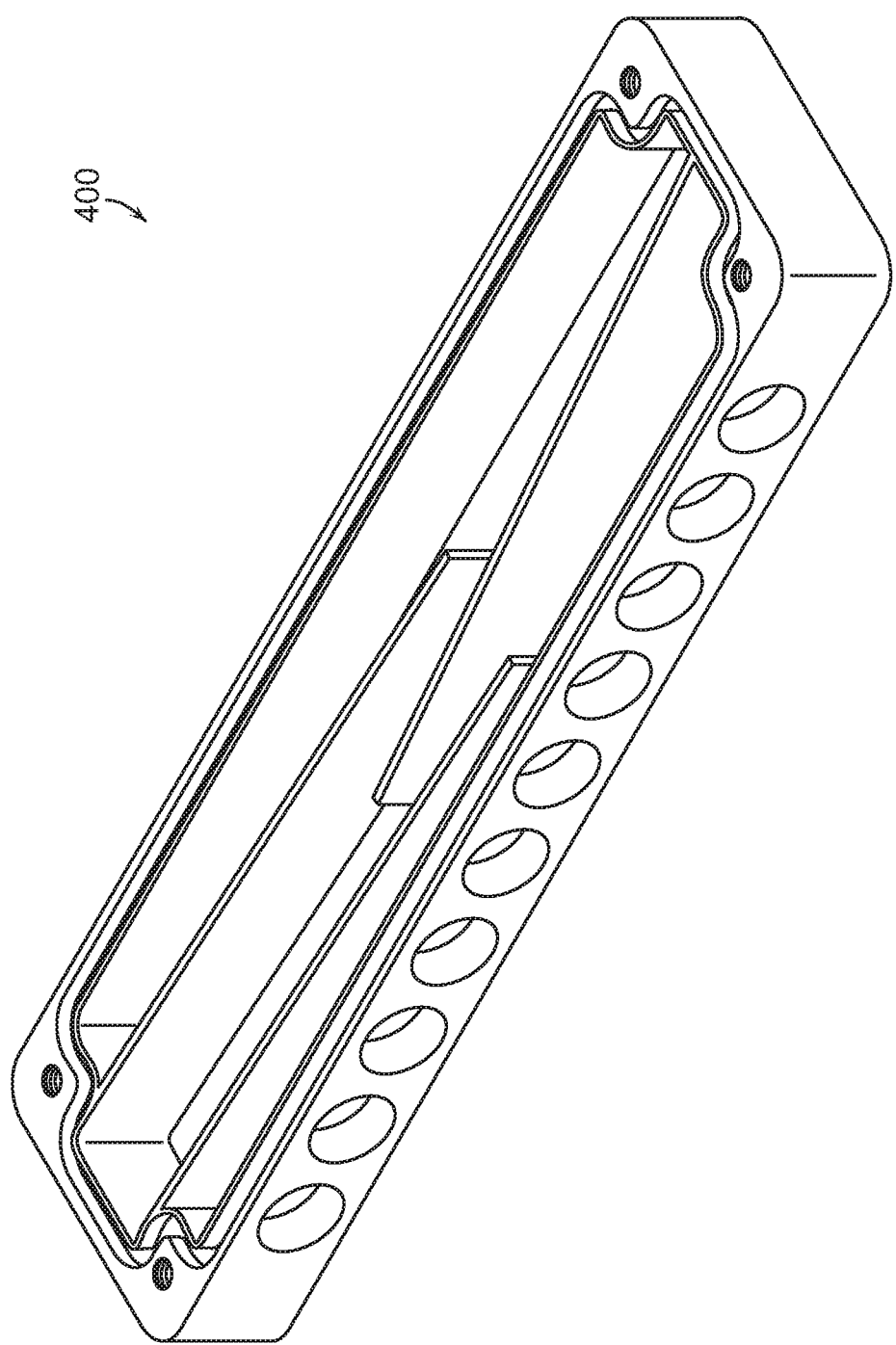
FIG. 4 is a perspective view of an airflow vent.

Referring to FIG. 4, a passive air flow vent 400 may be designed to provide air flow while preventing liquid intrusion into an interior space of a outer cabinet 160. The vent may be described as a single rectangular molded piece that is mounted horizontally side or sides of inner cage 100, preferably on opposing sides. Vent 400 may have internal overlapping, downward sloped baffles that prevent direct spray of liquid into the interior and allow the vent to drain these liquids away quickly through the circular apertures at the bottom. The baffles may extend the entire length of vent and overlap in an alternating pattern. The number of baffles may vary based upon the type of material used. The baffles may be of sufficient strength to prevent the desired amount of water spray intrusion in terms of both quantity and strength. Additionally, the baffles be implemented with a shallow enough angle to allow effective air flow to and from the protected inner cage 100. The internal baffles may be sprayed with a liquid repellant coating corresponding to the primary protection function of the vent.

In one implementation of this vent system, a thin, horizontal slot 412 is made at the highest location in the protected outer cabinet 160. The slot may be no more than the space inside the vent that does not overlap the topmost internal baffle. Four small holes may then be drilled into the protected outer cabinet 160. The vent may be placed horizontally over the slot and attached by four machine screws which go through outer cabinet and into the vent itself. The screws may then be tightened securely and evenly so that the peripheral gasket is flush and secure to outer cabinet. A second vent, on the opposing side of outer cabinet, may be installed in the same manner.

For clarity of explanation, the above description has focused on a representative sample of all possible embodiments, a sample that teaches the principles of the invention and conveys the best mode contemplated for carrying it out. The invention is not limited to the described embodiments. Well known features may not have been described in detail to avoid unnecessarily obscuring the principles relevant to the claimed invention. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed alternatives, variations, modifications, and equivalents are within the literal scope of the following claims, and others are equivalent. The claims may be practiced without some or all of the specific details described in the specification. In many cases, method steps described in this specification can be performed in different orders than that presented in this specification, or in parallel rather than sequentially, or in different computers of a computer network, rather than all on a single computer.

The invention claimed is:

1. A modular mounting for a computer motherboard, comprising:
    an outer cabinet designed to provide a protective enclosure for electrical components, and designed to permit throughhole drilling to facilitate mounting on a wall while avoiding disturbance of contents to be mounted within the outer cabinet;
    a subpanel plate designed to detachably and securely attach the computer motherboard and a cage assembly, and designed to removeably mount the computer motherboard and cage assembly within the outer cabinet as a modular component, mounting of the computer motherboard and cage assembly being independent of power supply and nonvolatile storage;
    an inner cage assembly designed to protectably mount and enclose the computer motherboard and a heat sink, and to mount the computer motherboard and cage assembly to the subpanel plate.

2. The modular mounting for a computer motherboard of claim 1, further comprising:
    a multipole switch having a set of contacts for each conductor of a network cable entering the outer cabinet, one throw of the multipole switch connecting all conductors to permit a CPU of the computer motherboard to communicate over the network cable to other devices of the network, another throw of the multipole switch disconnecting all contacts of the network cable.

3. The modular mounting for a computer motherboard of claim 2, further comprising: a key tumbler lock designed to move the multipole switch between the connected throw and the disconnected throw.

4. The modular mounting for a computer motherboard of claim 1, further comprising:
    an air vent having baffles designed to pass air and impede fluid intrusion.

5. The modular mounting for a computer motherboard of claim 4:
    the baffles being arranged in a zigzag pattern of overlapping baffles.

6. The modular mounting for a computer motherboard of claim 1, further comprising:
    a visual indicator having an illumination pattern indicating presence, absence, and status of virtual machines present on a physical machine corresponding to the switch.

7. The modular mounting for a computer motherboard of claim 1, further comprising:
    a touch switch connected to a physical machine and that, when activated, instructs the physical machine to transfer any virtual machines hosted or active thereon to be transferred to another physical machine.

8. The modular mounting for a computer motherboard of claim 1, wherein:
    the subpanel plate is designed to mount within the outer cabinet by recesses that hook onto raised features of the interior of the outer cabinet, to be secured by screws having a short threaded section to thread into fixation points at the rear of the outer cabinet, and a long shank section supporting a driving head readily accessible from a front opening of the outer cabinet.

9. The modular mounting for a computer motherboard of claim 1, wherein:
    the subpanel plate is designed to mount in the outer cabinet without the use of tools.

10. The modular mounting for a computer motherboard of claim 1, wherein:
the subpanel plate is designed to mount a power supply to be mountable with the computer motherboard and heat sink.

11. The modular mounting for a computer motherboard of claim 1, wherein: the subpanel plate is designed to mount a nonvolatile storage unit to be mountable with the computer motherboard and heat sink.

12. The modular mounting for a computer motherboard of claim 1, wherein:
the outer cabinet, subpanel plate, and inner cage unit are designed to encourage convective air flow to provide fanless passive cooling of the computer motherboard.

13. A modular mounting for a computer motherboard, comprising:
an outer cabinet designed to provide a protective enclosure for electrical components, and designed to permit throughhole drilling to facilitate mounting on a wall while avoiding disturbance of contents to be mounted within the outer cabinet;
a subpanel plate having attachment means for detachably and securely attaching the computer motherboard and a cage assembly, and having mounting means for removeably mounting the computer motherboard and cage assembly within the outer cabinet as a modular component, mounting of the computer motherboard and cage assembly being independent of power supply and nonvolatile storage;
an inner cage assembly designed to enclose the computer motherboard and a heat sink, having assembly means to attach to the computer motherboard to form the computer motherboard and cage assembly, and having mounting means to mount the computer motherboard and cage assembly to the subpanel plate.

14. The modular mounting for a computer motherboard of claim 13, further comprising:
a multipole switch having a set of contacts for each conductor of a network cable entering the outer cabinet, one throw of the multipole switch connecting all conductors to permit a CPU of the computer motherboard to communicate over the network cable to other devices of the network, another throw of the multipole switch disconnecting all contacts of the network cable.

15. The modular mounting for a computer motherboard of claim 14, further comprising: a key tumbler lock designed to move the multipole switch between the connected throw and the disconnected throw.

16. The modular mounting for a computer motherboard of claim 13, further comprising: an air vent having baffle means for passing air and impeding fluid intrusion.

17. The modular mounting for a computer motherboard of claim 16:
the baffles being arranged in a zigzag pattern of overlapping baffles.

18. The modular mounting for a computer motherboard of claim 13, further comprising:
a virtual machine indication means for displaying an illumination pattern indicating presence, absence, and status of virtual machines present on a physical machine corresponding to the virtual machine indication means.

19. The modular mounting for a computer motherboard of claim 13, further comprising:
a touch switch means connected to a physical machine for, when activated, instructing the physical machine to transfer any virtual machines hosted or active thereon to be transferred to another physical machine.

* * * * *